United States Patent [19]

Quinn

[11] 4,192,186
[45] Mar. 11, 1980

[54] FLUID LEVEL AND VISUAL INSPECTION DEVICE

[76] Inventor: James R. Quinn, 2723 W. Kalamath, Kennewick, Wash. 99336

[21] Appl. No.: 946,507

[22] Filed: Sep. 28, 1978

[51] Int. Cl.² .............................................. G01F 23/00
[52] U.S. Cl. ......................................... 73/303; 73/293
[58] Field of Search .......................... 73/303, 302, 293

[56] References Cited

U.S. PATENT DOCUMENTS

| | | | |
|---|---|---|---|
| 2,653,477 | 9/1953 | Hoskins | 73/302 |
| 2,653,564 | 9/1953 | Benefield | 116/118 R |
| 2,720,784 | 10/1955 | Kelly | 73/290 R |
| 2,761,316 | 9/1956 | Hoskins | 73/302 |
| 3,307,397 | 3/1967 | Brown et al. | 73/302 |
| 3,466,928 | 9/1969 | Kind | 73/293 |
| 3,782,323 | 1/1974 | Jones | 116/118 R |
| 3,834,235 | 9/1974 | Bouton et al. | 73/293 |
| 3,834,236 | 9/1974 | Durin | 73/302 |

FOREIGN PATENT DOCUMENTS 353710 7/1931 United Kingdom ....................... 73/303

*Primary Examiner*—Gerald Goldberg
*Assistant Examiner*—Joseph W. Roskos
*Attorney, Agent, or Firm*—Wells, St. John & Roberts

[57] ABSTRACT

A device enabling the operator of an internal combustion engine to visually inspect the quality and level of a fluid held within an associated fluid sump of the engine, transmission, or other adjacent fluid sump. The device operates directly from the vacuum system of the associated engine to selectively draw fluid from the sump upwardly into a viewing chamber. A lamp behind the chamber illuminates the fluid to facilitate visual inspection. If the fluid is below a prescribed level, no fluid will be drawn into the chamber, thereby indicating to the operator that the fluid level is below a specified minimum. The device may also be provided with a continuous monitoring system whereby fluid may be initially drawn into the visual inspection chamber and held there indefinitely or until the fluid drops below a prescribed level. When this happens, the continuous monitoring system may function to activate an annunciator giving warning to the engine operator that the fluid level is low.

17 Claims, 7 Drawing Figures

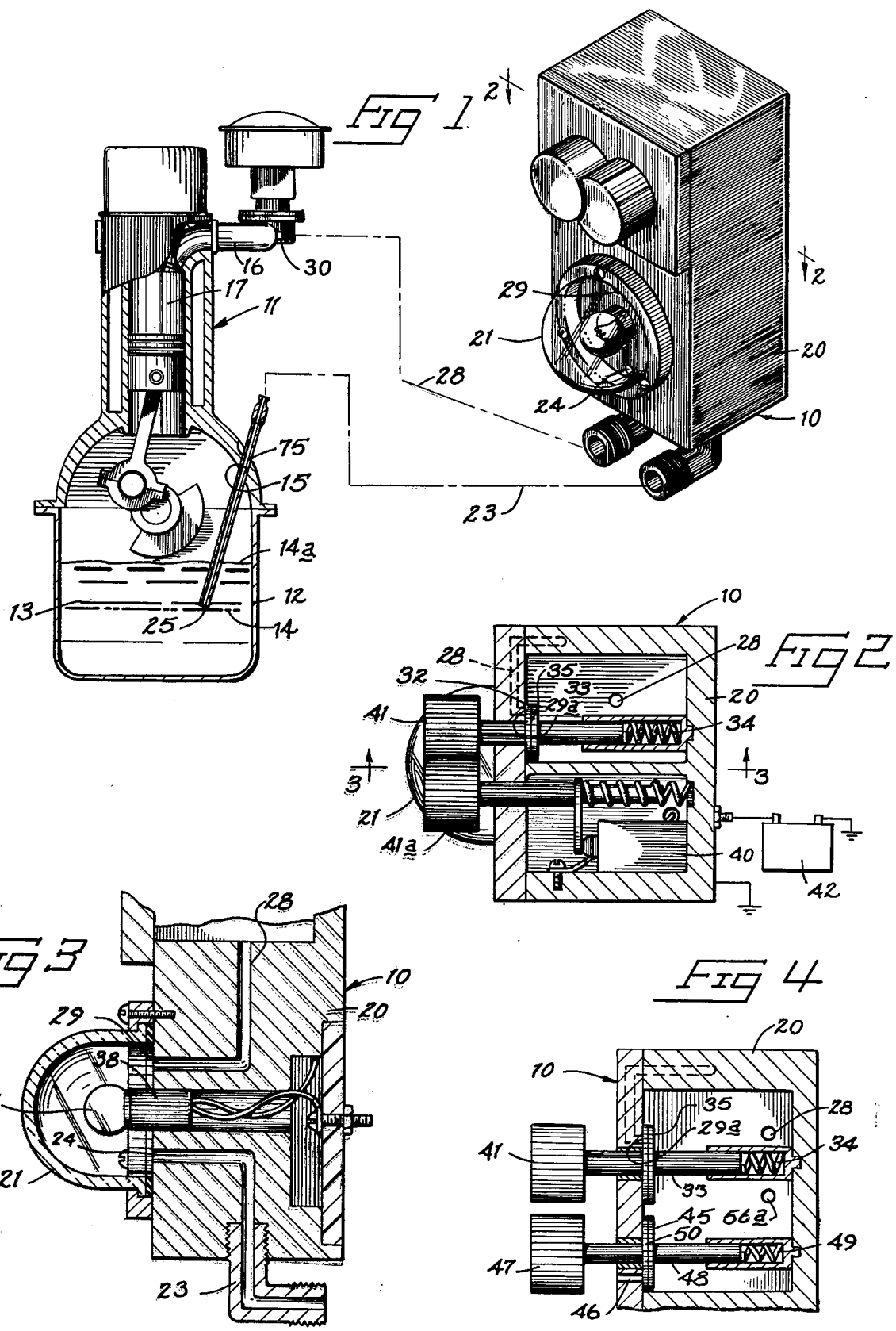

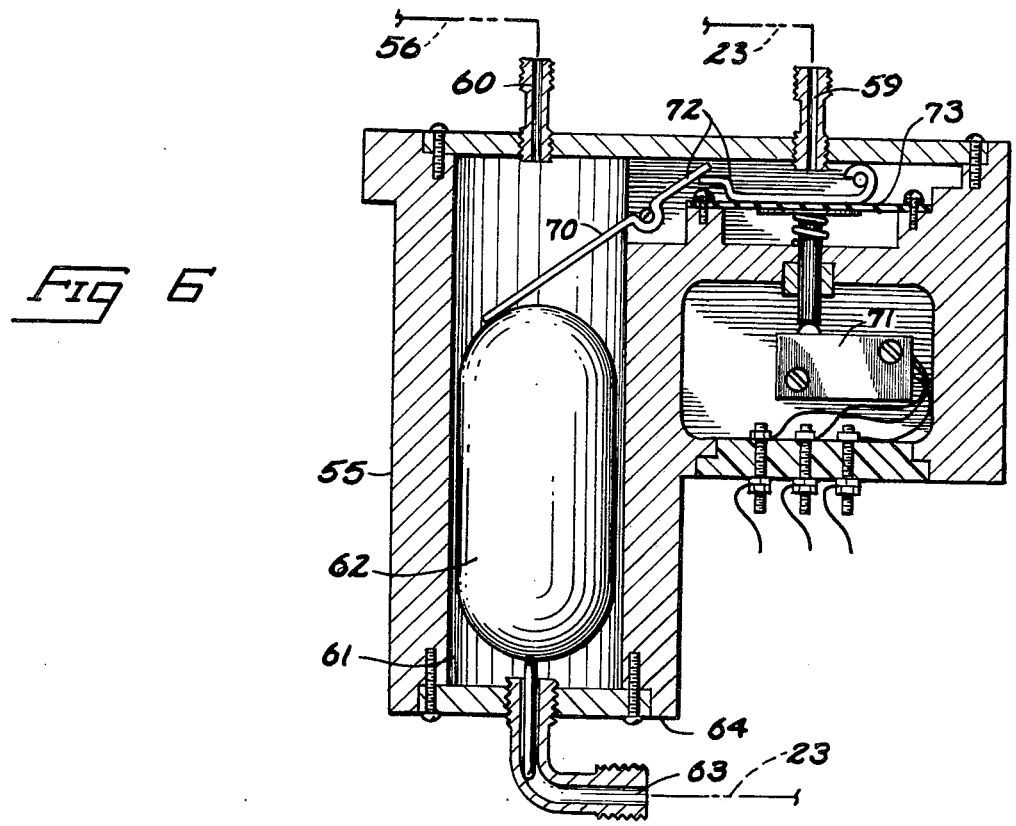
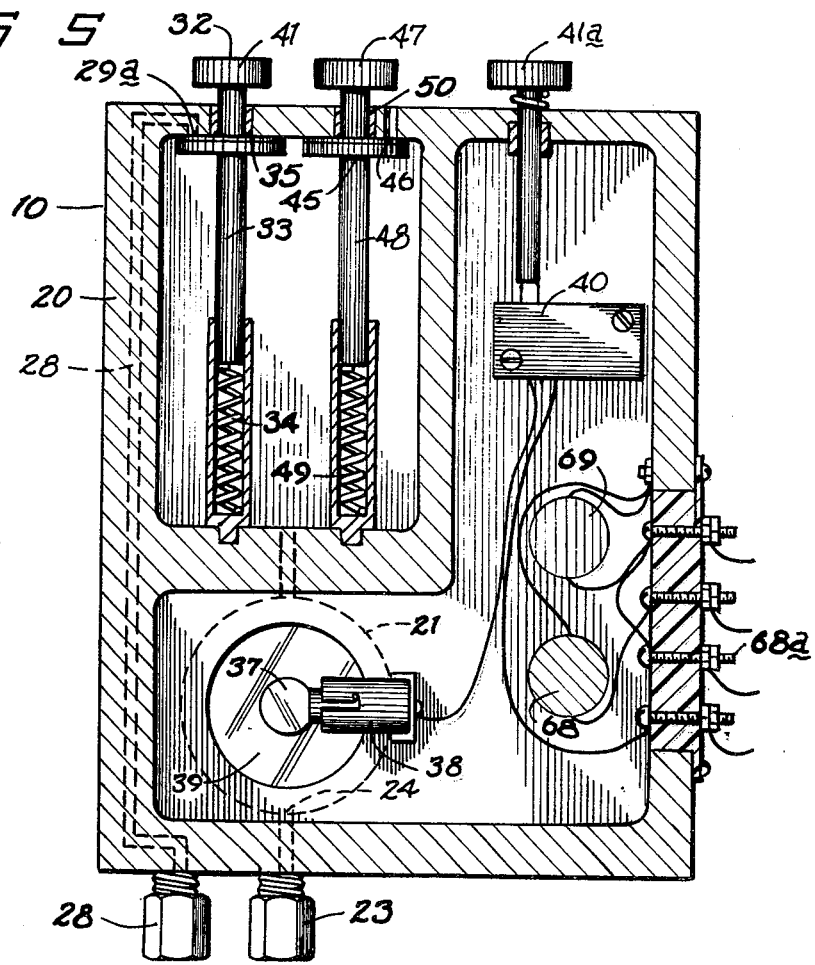

FLUID LEVEL AND VISUAL INSPECTION DEVICE

BACKGROUND OF THE INVENTION

The present invention is related to apparatus for sensing and indicating the level of a fluid within a fluid sump in association with an internal combustion engine and more particularly to such indicating devices having visual inspection windows whereby the quality of the fluid as well as its level may be examined.

Nearly all fluid sumps for oil or other fluid associated with an internal combustion engine make use of a "dip stick" by which the fluid level within the engine sump, transmission, etc., is periodically checked. To inspect the fluid level, the operator must pull the dip stick from the sump after the fluid has sufficiently settled to permit an accurate reading. The fluid level within the sump is indicated on the dip stick by the level reached by the liquid in relation to markings on the lower dip stick end. This is an inconvenient method by which the liquid level within a sump may be checked. It is also relatively ineffective for determining the consistency of quality of fluid within the sump since such a fine film is left remaining on the dip stick shaft.

Another problem is that the operator may forget or may not have sufficient time to stop and go through the several steps required for checking the fluid level and quality within a sump.

It therefore becomes desirable to obtain some form of visual inspection and level sensing device that will enable an operator to conveniently check the liquid level and quality of a fluid within a sump while the associated engine is running, without leaving his normal work station. It is also desirable to obtain such a device that may be located at a position remote from the associated engine such as within the cab of a vehicle or within a control station that is easily accessible by the operator.

It is also desirable to obtain some form of visual inspection and level sensing device that may be periodically operated or that may be automatically and continuously operated to monitor the level and quality of a fluid within a sump.

BRIEF DESCRIPTION OF THE DRAWINGS

FIG. 1 is an isometric view of one form of the present device in association with the internal combustion engine, the engine being shown in diagrammatic form and connections between the engine and the device being shown by dashed lines;

FIG. 2 is a sectional view taken along line 2—2 in FIG. 1;

FIG. 3 is a fragmentary sectional view taken through the lower half of the device substantially along line 3—3 in FIG. 2;

FIG. 4 is a view similar to FIG. 2 only showing the addition of a vent valve;

FIG. 5 is a sectional view of an alternate form of the device;

FIG. 6 is a sectional view of a continuous monitoring arrangement for operation in association with the embodiment shown in FIG. 5; and FIG. 7 is a sectional view taken through a siphon tube arrangement for use in conjunction with the alternate forms of the present device.

DETAILED DESCRIPTION

The present device is indicated in the accompanying drawings by the reference character 10. The device 10 is shown generally in FIG. 1 and more particularly in FIGS. 2 and 3. A first alternate form of the device 10 is shown in FIG. 4 and another alternate arrangement is shown in FIGS. 5 and 6.

The present device is intended for use in the environment of a machine or vehicle that is powered by or in some manner includes an internal combustion engine 11 that utilizes a vacuum system for drawing combustion air into its firing chambers. Use of the present device is not strictly limited to indicating the level and consistency of the oil in the crank case sump of such an engine but is particularly adapted to do so. Other fluid sumps associated with an engine 11 may also be monitored for fluid level and consistency by the present device with only minor modifications required. Examples are: transmission fluid sumps; axle housing sumps; hydraulic fluid sumps (as with brake fluid reservoirs and other hydraulic actuator fluid supply tanks that are associated with an engine 11).

For convenience, an engine 11 is shown in the accompanying drawings and the present invention is also shown in FIG. 1 as operating to indicate the level and consistency of oil within the engine crank case. The engine 11 includes a fluid sump 12 for containing a fluid or liquid 13, usually oil. It is desirable to maintain the fluid 13 above a prescribed level as shown at 14 within the sump. The level of fluid 13 within the sump 12 is, or should be, periodically inspected through a "dip stick" aperture 15. This aperture allows access to the otherwise closed sump area.

The engine 11 includes a vacuum manifold 16 through which air is drawn into the combustion chamber(s) 17. The present device 10 is adapted to connect to the vacuum manifold and communicate with the fluid within sump 12 through the dip stick aperture 15. This is diagrammatically illustrated in FIG. 1.

Basically the device 10 includes a housing 20 having a viewing chamber 21 thereon. A fluid conduit 23 has an end 24 in open communication with the interior of the viewing chamber 21. Conduit 23 also includes a remaining end 25 that is receivable within the sump 12 at a level below the top level 14a for the fluid 13. A vacuum air conduit 28 is provided with one end 29 in open communication with the viewing chamber interior. The remaining end 30 of the vacuum air conduit 28 is adapted to be in open communication with the engine vacuum manifold 16. A valve means 32 is provided to selectively open the vacuum air conduit 28 to the fluid conduit 23. Vacuum pressure within the housing causes the fluid to be drawn from sump 12 to the viewing chamber 21. A switch operated lamp 37 is located within the housing for selectively illuminating the fluid held within the viewing chamber 21.

The valve means 32 for vacuum air conduit 28 includes a plunger 33. A spring 34 is operatively connected between the plunger 33 and housing walls. It continuously urges the plunger 33 to an outward closed position. A valve seat 35 (preferably constructed of rubber material) is positioned on the plunger 33. Seat 35 selectively seals the air conduit 28 from the viewing chamber 21. An actuator 41 is provided outside the housing and is connected to the plunger 33. The actuator enables selective manual operation of the valve means 32 to open the vacuum air conduit 28.

An intermediate end 29a of conduit 28 is situated closely adjacent to the plunger 33 and in the path of the valve seat 35. The end 29a includes an orifice of reduced size in relation to the fluid conduit. This restricts possible flow of fluid to the intake manifold should the vacuum valve means fail to operate properly. The orifice is sufficiently small to allow only a small volume of the fluid through the vacuum air conduit 28 to avoid damage to the associated engine.

The lamp 37 is included as means for selectively illuminating the fluid viewing chamber 21. The lamp 37 is received within a socket 38 provided within a recess of the housing 20. The socket 38 may be sealed relative to the housing with the lamp 37 extending into the viewing chamber 21 (FIGS. 1 and 3). Alternatively, it may be located within a recess formed in the housing adjacent a window 39 that seals the recess from the viewing chamber (FIG. 5).

In either of the above arrangements the lamp 37 is electrically connected to a switch 40. A switch actuator 41a extends outwardly of the housing. A power supply 42 (preferably associated with the ignition system for the engine 11) is shown diagrammatically by FIG. 2. Here, the power supply is shown as a battery. However, it is well understood that the source for electrical energy may be provided through other electrical systems associated with the engine 11 or other outside sources.

The valve plunger 33 of FIG. 2 is slidably fitted to the housing so as to allow seepage of air into the fluid viewing chamber. The air seepage rate is not enough to impede effective operation of the vacuum valve means 32 but it does allow the fluid to drain back from the viewing chamber 21 to the sump. This air bleed feature may also be provided by some other appropriate device to enable drainage of the viewing chamber 21 and fluid conduit 23.

FIG. 4 illustrates a hermetically sealed embodiment of the present invention utilizing a vent valve means 45 that facilitates quick draining of the housing and viewing chamber 21. It includes a vent 46 that extends to openly communicate with the atmosphere outside the housing 20. The vent 46 is located at or adjacent the top of the housing 20. This prevents undesired flow of fluid through the vent to the outside of the housing.

The vent valve means 45 includes an actuator 47 and associated plunger 48. An airtight seal is provided between the plunger and housing. Valve means 45 also includes a spring 49 that urges the plunger to press a valve seat 50 over the vent 46. When the operator pushes the actuator 47, the hermetic seal will be broken as the seat 50 moves inwardly. Air at atmospheric pressure will then be vented to the interior of the housing. This will allow fluid to run from the housing back into the sump.

A siphon tube 56 (FIG. 7) may be utilized in conjunction with the form of the device illustrated in FIG. 4. The siphon tube 56 is provided in addition to the fluid conduit 23. It may extend from an opening 56a within the housing 20 (in open communication with the viewing chamber 21) to an open lower end 57 that is situated above the end 25 of conduit 23.

With the hermetic seal normally provided within the housing, the siphon tube 56 and viewing chamber 21 may serve as a continuous monitoring means which will automatically indicate to the operator the precise moment when the fluid drops below a prescribed level in the sump.

The open lower end 57 of the siphon tube will become exposed to air within the area above the sump as the liquid level drops. This would open the otherwise closed fluid circuit to the atmosphere and allow the fluid to run from the viewing chamber and back into the sump. This drainage of the fluid from within the viewing chamber functions as a signal to the operator that the fluid has moved beyond a prescribed lower limit. The lamp 37 will appear brighter through the viewing chamber to intensify the signal effect.

The vent valve means 45 can also be selectively operated to break the hermetic seal within the housing and allow the fluid to flow from the housing and viewing chamber back into the sump. This may be done prior to reopening of the vacuum valve 32 to bring a fresh supply of fluid to the viewing chamber in order to facilitate visual examination of the quality of the fluid at that time.

Another form of the continuous monitoring means is illustrated in conjunction with FIGS. 5, 6 and 7. In FIG. 6, a housing 55 is illustrated for connection to the siphon tube 56 and the fluid conduit 23 and housing 20. It includes an opening 60 for the siphon tube 56 and the fluid conduit 23 and housing 20. It includes an opening 60 for the siphon tube 56 leading to a float chamber 61 enclosed therein. A float 62 moves elevationally within the float chamber 61 in response to reception of fluid within the chamber. An outlet 63 is provided for conduit 23 leading from the bottom 64 of housing 55 to the sump. The housing 20 is openly connected through conduit 23 with the float chamber 61 at a second fitting 59 on top of the housing 55.

A signal means is provided within the monitoring means which, in FIGS. 5 and 6, takes the form of an electrical indicating arrangement. Here the annunciator is in the form of a green light 68 and a red light 69 operated by an annunciator actuator means 70. Means 70 includes a switch 71. It may also include an actuator linkage 72 that operatively communicates with the float 62. Linkage 72 responds to elevational movement of the float 62 to operate the switch 71. A diaphragm 73 is provided between linkage 72 and switch 71. Diaphragm 73 prevents the fluid from entering the hollow portion of the housing that encloses switch 71.

The switch 71 is preferably a two-way switch that may be electrically connected to the green and red lights and to a source of electrical energy. The circuitry may be arranged such that when the float is elevated in an "up" position (as where the housing is filled with fluid) the switch is operated to activate the green light. When the fluid level drops within housing 55, the float will also drop and the switch will move to the remaining "down" position to deactivate the green light and activate the red light. The red light 69 will thereby serve as a warning annunciator to the operator of a low fluid level situation. The green light serves two functions. It indicates that the electrical system is working. It also indicates a safe fluid level. Other forms of annunciator can be used separately or in conjunction with those shown. An accessory annunciator terminal 68a may be provided for this purpose (FIG. 5).

Installation of any illustrated form of the present device is made first by inserting the fluid conduit 23 into the sump 12 to a level therein that is selected to be the minimum accepted fluid level within the sump. This may be done either cutting the tube end 25 relative to a stop 75 provided thereon, or providing an adjustable stop (not shown) on the tube that enables selective positioning of the end 25 at a selected level within the sump. With the variation illustrated in FIG. 7, it is preferred that the end 57 of the siphon tube 56 be upwardly adjacent the minimum fluid level.

The receiver housing 55 (depending on the embodiment used) may be mounted adjacent to the engine and is situated at a level above the sump to facilitate flow of fluid back and forth from the receiving housing to the sump. Similarly, the housing 20 is situated adjacent to the operator's station at a location above the receiver housing 55.

Operation of the FIG. 4 embodiment involves uses of the FIG. 7 siphon tube arrangement. Operation is initiated as the valve means is actuated to open the vacuum air conduit 28 to the siphon tube 56 and fluid conduit 23. The vacuum pressure thus applied operates to draw fluid through conduit 23 and into the housing 20 where it fills the viewing chamber 21. Once the chamber fills, the operator may release the valve means 32 to again close off the vacuum air before the fluid level rises into the vacuum air conduit 28. The hermetic seal of the housing and conduit 23 will cause the fluid to remain in the viewing chamber until air is allowed to enter the system. This is done only when the siphon tube end 57 becomes exposed to air as the fluid level drops below the selected minimum. When this happens the fluid will drain from chamber 21 back into the sump. The empty chamber 21 and brighter light from lamp 37 will warn the operator of the low fluid level situation. If the operator wishes to check the fluid at intermittent times, he can drain the viewing chamber and then refill it. This is done by breaking the hermetic seal through selective use of the vent valve means 45. The actuated valve 45 will open the housing and conduits to the atmosphere, breaking the seal and allowing the fluid to drain back into the sump. Subsequent operation of the vacuum valve means 32 will cause more fresh fluid to be drawn into the viewing chamber providing the fluid level in the sump is above the minimum level. If not, no fluid will enter the chamber 21 and the operator will be made aware that the fluid level is low.

Operation of the FIG. 5 form of device 10 is also initiated by actuation of the vacuum valve means 32 to open the vacuum line into direct communication with fluid conduit 23 and tube 56. This causes fluid to be drawn from the sump upwardly through the receiver housing 55 and into the viewing chamber 21. Fluid is also drawn through the siphon tube 56. As the fluid level reaches the top of the viewing chamber 21, the vacuum valve 32 may be released. This cuts off the vacuum pressure supply and seals the interior of the housing from the outside atmosphere. Visual inspection may then be made by activating the lamp 37 and inspecting the illuminated fluid within the viewing chamber 21. The sealed housings and fluid conduits permit the fluid to remain in the viewing chamber until the vent valve means is actuated to drain the chamber.

If the fluid level moves downward to a level below the open siphon tube end 57, the fluid will run from the receiver housing back into the sump. This causes float 62 to move downwardly and move switch 71 to a position to activate the red light 69. The red light 69 or other appropriate annunciator will indicate to the operator that the fluid level is dangerously low.

Should the operator wish to drain the fluid from the housing 20, he simply opens the vent valve means 45. Means 45 operates to break the seal and vent the interior of the housing to the atmosphere. The fluid will flow freely through the conduit 23, siphon tube 56 and receiver housing 55 back to the sump. Until the vent valve 45 means is actuated, however, the hermetic seal will remain and the fluid will stay within the viewing chamber.

The operator may recheck the condition of the fluid in the sump by using the vent valve means 45 to drain the housings 20 and 55 and then opening the valve means 32. This will direct vacuum pressure through both housings to draw fluid into the previously drained viewing chamber 21.

Operation of the form illustrated in FIG. 1 is somewhat similar to the steps described above. The distinction is that the valves are arranged within the housing 20 so that a slow air leak will allow seepage of the fluid back into the sump after it has been initially drawn into the viewing chamber. In this situation, the level of the fluid is indicated only through the viewing chamber and only the single fluid conduit 23 is utilized. When the fluid drops below a prescribed level, no fluid can be drawn through the conduit 23 and into the viewing chamber. When the vacuum valve 32 is operated to draw the fluid into the viewing chamber, only air will be drawn into the chamber 21, thereby indicating to the operator that the fluid is below the end 25 of conduit 23.

It may be understood from the above description and attached drawings that various changes and modifications may be made therein. Such modifications are within the contemplation of the present application and the scope of my invention is defined only by the following claims.

What I claim is:

1. A fluid level and visual inspection device for internal combustion engines having a fluid sump and a vacuum system whereby air is drawn into the engine, said device comprising:
   a housing;
   a fluid viewing chamber within the housing;
   a fluid conduit having one end in open communication with the fluid viewing chamber and a remaining open end adapted to be submerged within a fluid held within a sump of an engine;
   a vacuum air conduit having one end in open communication with the fluid viewing chamber and a remaining open end adapted to be connected to the vacuum system of an associated engine;
   valve means operatively connected to the vacuum air conduit for selectively opening and closing the vacuum air conduit so that when the vacuum air conduit is opened, vacuum pressure may be applied within the viewing chamber, thereby causing fluid to be drawn into the viewing chamber; and
   means for selectively illuminating the fluid viewing chamber; and
   a siphon tube extending along the fluid conduit to an open lower end above the open end of the fluid conduit and having an upper end in open communication with the fluid viewing chamber.

2. A device as defined by claim 1 further comprising vent valve means for selectively hermetically sealing the fluid viewing chamber, the fluid conduit and the vacuum air conduit from outside air when the remaining end of the fluid conduit is immersed in a fluid and the remaining end of the vacuum air conduit is connected to a vacuum system of an associated engine.

3. The device as defined by claim 2 further comprising continuous monitoring means in open communication with the fluid conduit for automatically producing a signal when the fluid within the sump of an associated engine falls below a prescribed level.

4. The device as defined by claim 3 wherein the continuous monitoring means includes:
a fluid receiving housing;
wherein said fluid conduit is also in open communication with the fluid receiving housing at a point between its one end and remaining end;
a float within the fluid receiving housing elevationally movable therein in response to fluid received within the fluid receiving housing;
signal means operatively associated with the float for actuation by the float when the float moves beyond a prescribed elevation within the fluid receiving housing.

5. The device as defined by claim 4 wherein the signal means includes an annunciator for translating the signal into a perceptible warning, indicating to an operator of the associated engine that the fluid level within the engine sump has reached a minimal level; and annunciator actuator means responsive to the float for activating the annunciator means when the float moves beyond the prescribed elevation.

6. The device as defined by claim 1 further comprising an orifice in the vacuum air conduit for restricting flow of fluid through the vacuum air conduit.

7. The device as defined by claim 2 wherein an open air passage is formed through the housing at an upper end thereof and is selectively sealed by the vent valve means.

8. The device as defined by claim 1 for internal combustion engines having a dip stick aperture formed therein leading to the fluid sump;
wherein the fluid conduit and siphon tube are adapted to extend through the dip stick aperture to communicate with fluid held in the sump.

9. The device as defined by claim 1 wherein the last named means includes:
an electrical lamp within the housing;
switch means electrically connected to the lamp; and
terminals wired to the switch means and lamp adapted to be connected to a source of electrical energy.

10. A fluid level visual inspection device for indicating the level and consistency of a fluid in a sump that is associated with an internal combustion engine having a fluid sump and a vacuum air system whereby air is drawn into the engine, said device comprising:
a housing;
a fluid viewing chamber within the housing;
a fluid conduit having one end in open communication with the fluid viewing chamber and a remaining open end adapted to be submerged within a fluid held within a sump;
a vacuum air conduit having one end in open communication with the fluid viewing chamber and a remaining open end adapted to be connected to a vacuum air system of an associated internal combustion engine;
valve means operatively connected to the vacuum air conduit for selectively opening and closing the vacuum air conduit so that when the vacuum air conduit is opened, vacuum pressure may be applied within the viewing chamber, thereby causing a fluid to be drawn from a sump into the viewing chamber; and
means for selectively illuminating the fluid viewing chamber; and
a siphon tube with one end in communication with the fluid viewing chamber and with an open end adapted to extend into the fluid sump for draining fluid from the viewing chamber in response to dropping of the fluid level in the sump below a selected level.

11. A device as defined by claim 10 further comprising vent valve means for selectively hermetically sealing the fluid viewing chamber, the fluid conduit and the vacuum air conduit from outside air when the remaining end of the fluid conduit is immersed in a fluid and the remaining end of the vacuum air conduit is connected to a vacuum system of an associated engine.

12. The device as defined by claim 10 further comprising continuous monitoring means in open communication with the fluid conduit for automatically producing a signal when the fluid within a sump falls below a prescribed level.

13. The device as defined by claim 12 wherein the continuous monitoring means includes:
a fluid receiving housing;
wherein said fluid conduit is also in open communication with the fluid receiving housing at a point between its one end and remaining open end;
a float within the fluid receiving housing and elevationally movable therein in response to fluid received within the fluid receiving housing;
signal means operatively associated with the float for actuation by the float when the float moves beyond a prescribed elevation within the fluid receiving housing.

14. The device as defined by claim 13 wherein the signal means includes an annunciator for translating the signal into a perceptible warning, indicating to an operator that a fluid level within a sump has reached a minimal level; and annunciator actuator means responsive to the float for activating the annunciator means when the float moves beyond the prescribed elevation.

15. The device as defined by claim 10 further comprising an orifice in the vacuum air conduit for restricting flow of fluid through the vacuum air conduit.

16. The device as defined by claim 11 wherein an open air passage is formed through the housing at an upper end thereof and is selectively sealed by the vent valve means.

17. The device as defined by claim 10 wherein the last named means includes:
an electrical lamp within the housing;
switch means electrically connected to the lamp; and
terminals wired to the switch means and lamp adapted to be connected to a source of electrical energy.

* * * * *